(12) United States Patent
Parkinson

(10) Patent No.: US 7,725,585 B2
(45) Date of Patent: May 25, 2010

(54) METHODS AND SYSTEMS FOR ALERTING A USER INTERFACE WITH FULL DESTINATION INFORMATION

(75) Inventor: Steven William Parkinson, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 618 days.

(21) Appl. No.: 11/469,475

(22) Filed: Aug. 31, 2006

(65) Prior Publication Data

US 2008/0059628 A1    Mar. 6, 2008

(51) Int. Cl.
     G06F 15/16    (2006.01)
(52) U.S. Cl. .................................... 709/227; 726/22
(58) Field of Classification Search ................ 709/227; 726/22–25
See application file for complete search history.

(56) References Cited

U.S. PATENT DOCUMENTS

| | | | |
|---|---|---|---|
| 2002/0124172 A1* | 9/2002 | Manahan | 713/176 |
| 2006/0021031 A1* | 1/2006 | Leahy et al. | 726/22 |
| 2006/0174119 A1* | 8/2006 | Xu | 713/170 |
| 2007/0101423 A1* | 5/2007 | Oliver et al. | 726/22 |
| 2007/0136806 A1* | 6/2007 | Berman | 726/22 |
| 2008/0163337 A1* | 7/2008 | Tuliani et al. | 726/2 |
| 2008/0172741 A1* | 7/2008 | Reumann et al. | 726/23 |

OTHER PUBLICATIONS

Phishguard.com, Phishguard anti-scam system, Dec. 4, 2004 http://www.phishguard.com/products.htm (site is no longer active but can be accessed via http://www.archive.org).*

Phishguard 1.2, Download Software 4 Free! Phishguard 1.2 Developer Description, May 2, 2006, source: http://phishguard.phishguard-corporation.downloadsoftware4free.com/.*

Zumpft, PhishGuard Launches Free Service to Combat Internet "Phishing" and "Spoofing" Scams, Sep. 24, 2004, PRWeb, http://www.prweb.com/releases/2004/09/prweb161077.htm.*

Phishguard Help Manual, Feb. 24, 2005, PhishGuard Corporation, http://www.phishguard.com/PhishGuardHelp.pdf (site is no longer active but can be accessed via http://www.archive.org).*

(Continued)

*Primary Examiner*—Nathan Flynn
*Assistant Examiner*—James E Conway
(74) *Attorney, Agent, or Firm*—MH2 Technology Law Group LLP

(57) ABSTRACT

According to embodiments of the present disclosure, expanded destination information is provided to prevent information theft. In some embodiments, a browser is configured to provide a user with information about a secure destination, for example, a SSL website. By providing the user with information about the secure destination, the user may confirm that the secure destination is the correct destination. In addition, embodiments of the present invention may indicate to the user whether the requested destination is "safe" or "unsafe" before the user submits any information to that destination. In particular, if form fields are being submitted by the user, then a safe/unsafe indication may be provided before the user submits any information. The safety of the submission may be indicated in various ways, such as making the background of the web page a prominent color, making the "submit" button a certain color, or by writing text into a part of the browser's display.

13 Claims, 5 Drawing Sheets

OTHER PUBLICATIONS

Kirda et al., Protecting Users Against Phishing Attacks with Antiphish, Jul. 28, 2005, Compsac 2005—IEEE.*

Chou et al., Client-side defense against web-based identity theft, Feb. 2004, 11th Annual Network and Distributed System Security Symposium (NDSS '04).*

Ding et al., "Anomaly Based Web Phishing Page Detection," acsac, pp. 381-392, 22nd Annual Computer Security Applications Conference (ACSAC'06), Dec. 2006.*

Chou et al., Client-side defense against web-based identity theft, 2004.*

Wu, Thesis Proposal: Fighting Phishing at the User Interface, May 2006.*

Drake et al., Anatomy of a Phishing Email, 2004.*

Wu et al., Web Wallet: Preventing Phishing Attacks by Revealing User Intentions, 2006.*

\* cited by examiner

METHODS AND SYSTEMS FOR ALERTING A USER INTERFACE WITH FULL DESTINATION INFORMATION

FIELD

This invention relates generally to security systems and methods.

BACKGROUND

Presently, consumers utilize the Internet to perform many different tasks that were conventionally done in person. Consumers can utilize the Internet to purchase products, perform personal transaction, and manage funds. During these tasks, consumers may be required to enter sensitive personal information. In order to protect personal information during these transactions, different types of security protocols are utilized such as secure socket layer (SSL). SSL is a network protocol for transmitting private documents via the Internet. SSL uses a cryptographic system that uses two keys to encrypt data—a public key known to everyone and a private or secret key known only to the recipient of the data.

When establishing a connection to an SSL website, the consumer is typically given a warning or popup. Further, the web browser displays other indictors such as an open or closed lock and different colors in the address bar. Additionally, the web browser displays the originating address of the website. However, the web browser does not display the true destination of information submitted to the secure website. Additionally, if an address is displayed, the web browser usually truncates the complete originating address. As such, the consumer never fully knows the destination of any information submitted in the SSL website. If the consumer does not know the true destination, the consumer may submit sensitive information to an invalid or false website.

Known web browsers may provide a warning to the user that they are about to submit information to a non-SSL website or that the destination is not the same as the origin of the web page. However, these warnings are only displayed after the user has selected "submit" and will often ignore these warnings. In these instances, the user's information is then in jeopardy and may be stolen.

BRIEF DESCRIPTION OF THE DRAWINGS

The accompanying drawings, which are incorporated in and constitute a part of this specification, illustrate one embodiment of the invention and together with the description, serve to explain the principles of the invention.

DESCRIPTION OF THE EMBODIMENTS

Presently, a web browser can be manipulated into not displaying the true destination of information submitted to a secure website. For example, a website with a large number of spaces or characters or uses Unicode characters in its domain name may displayed by the browser with a deceiving name. As such, the user never fully knows the destination of any information submitted to a secure website such as an SSL website. According to embodiments of the present disclosure, expanded destination information is provided to prevent information theft. An application provides a user with information about a secure destination, for example, a SSL website. By providing the user with information about the secure destination, the user may confirm that the secure destination is the correct destination.

In addition, embodiments of the present invention may indicate to the user whether the requested destination is "safe" or "unsafe" before the user submits any information to that destination. In particular, if form fields are being submitted by the user, then a safe/unsafe indication may be provided before the user submits any information. The safety of the submission may be indicated in various ways, such as making the background of the web page a prominent color, such as red or green, making the "submit" button a certain color, or by writing text into a part of the browser's display, such as the browser's chrome portion.

Reference will now be made in detail to the exemplary embodiments of the invention, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Figure 1:
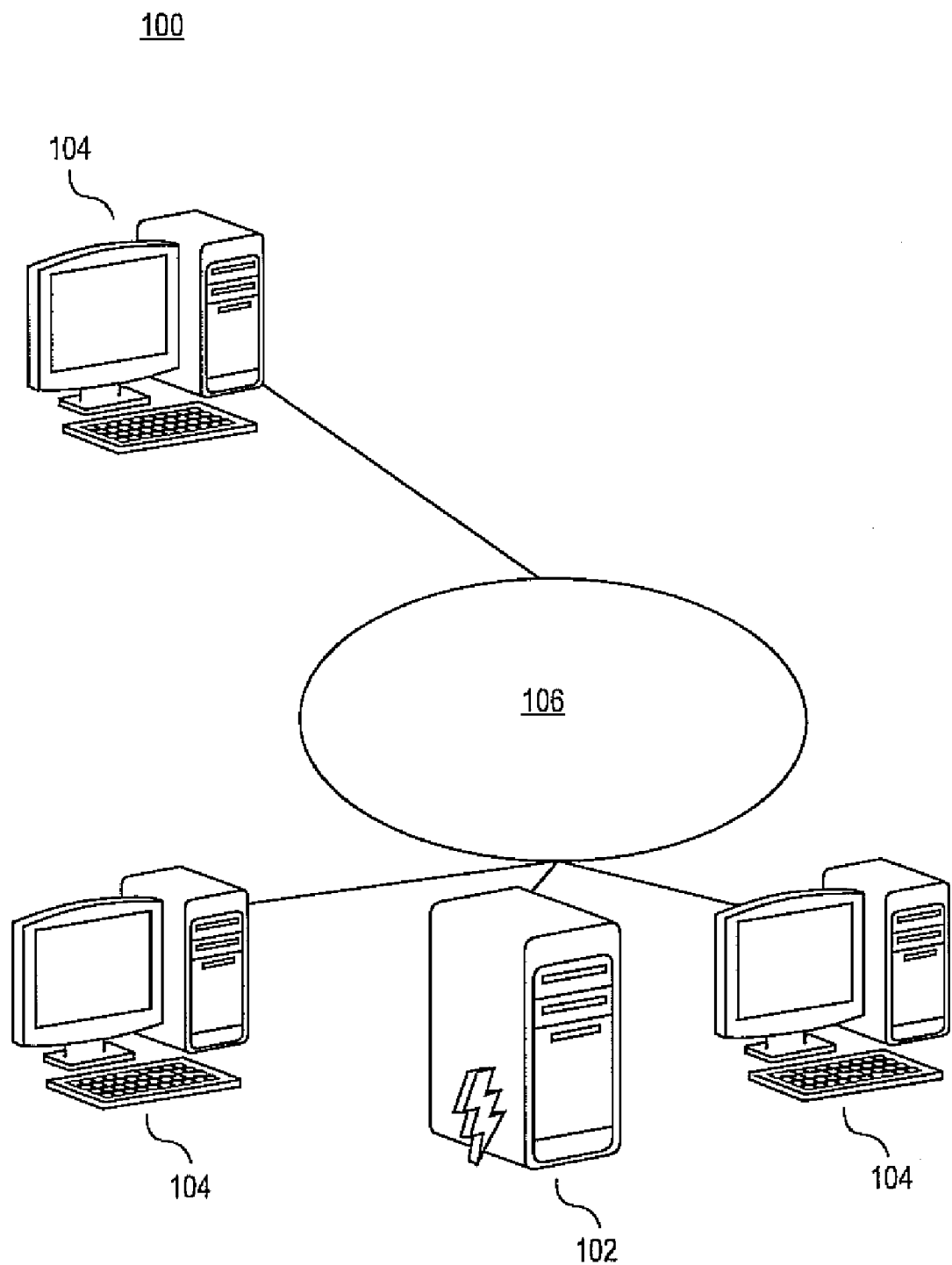
FIG. 1 is a diagram illustrating an exemplary network system consistent with embodiments of the present disclosure.

According to embodiments of the present disclosure, information theft is prevented by providing a user with destination information. FIG. 1 is a diagram illustrating a network system 100 in which the information theft may be prevented. System 100 may include a server 102 and clients 104. Server 102 and clients 104 may be interconnected via a network 106. Network 106 may be any type of network such as an internet the Internet, a wide area network, or a local area network. FIG. 1 shows system 100 including three clients and one server connected via a single network. One skilled in the art will realize that system 100 may include any number of clients and servers connected via multiple networks.

Server 102 may be a computing machine or platform configured to execute a network system through an operating system in conjunction with clients 104. Server 102 may send data to clients 104 and receive data from clients 104. Server 102 may be configured to host secure destinations, such as SSL websites. Server 102 may be implemented with any known server platforms such as those from Intel, Advanced Micro Devices, Hewlett-Packard, etc. One skilled in the art will realize that the above server systems are exemplary and server 102 may be implemented in any known platform.

Clients 104 may be computing machines or platforms configured to execute applications to perform methods for preventing information theft. Clients 104 may implements network application such as web browsers. Clients 104 may be implemented with personal computers, workstations, thin clients, thick clients, or other similar computing platforms. Clients 104 may use operating systems such as Linux, Windows, Macintosh or other available operating systems. One skilled in the art will realize that the implementations of clients 104 are exemplary and clients 104 may be implemented in any type of computer system.

Figure 2:
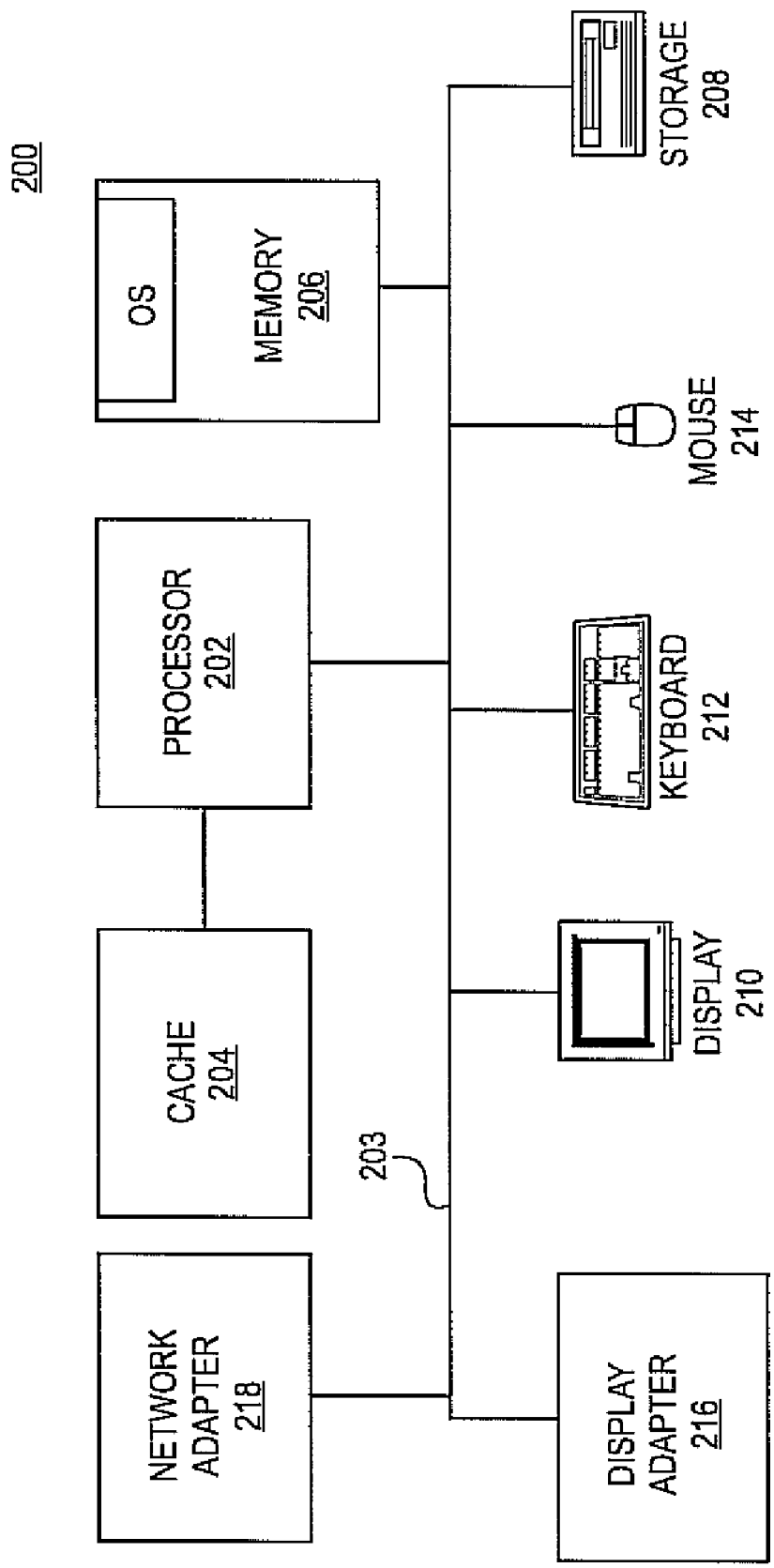
FIG. 2 is a diagram illustrating an exemplary computing platform consistent with embodiments of the present disclosure.

FIG. 2 is a block diagram of an exemplary computing platform 200 capable of performing embodiments of the present disclosure. Computing platform 200 may be utilized as clients 104 and server 102. The methods for preventing information theft may be implemented in an application written in program code and executed by the computing platform 200. The application may be implemented in computer languages such as PASCAL, C, C++, JAVA, HTML and the like, For example, when a SSL website is being accessed, a web browser, such as Explorer, Firefox, etc., may be executed on computing platform 200. One skilled in the art will realize that the methods for preventing information theft may be implemented in any computer language and any application capable of establishing a network connection.

As shown in FIG. 2, the computing platform 200 may include one or more processors such as the illustrated processor 202 that provide an execution platform for embodiments of the of the present disclosure. Processor 202 may be connected to a cache 204 to serve as a working memory. Commands and data from the processor 202 may be communicated over a communication bus 203.

Computing platform 200 may include a main memory 206, such as a Random Access Memory (RAM), where the operating system and applications implementing the methods described above may be executed during runtime. Main memory 206 may be coupled to communication bus 203.

Computing platform 200 may include one or more secondary memories 208. Secondary memories may be coupled to communications bus 203. The secondary memories 208 may include, for example, a hard disk drive and/or a removable storage drive, representing a floppy diskette drive, a magnetic tape drive, a compact disk drive, and the like, where a copy of a computer program embodiment for applications for preventing information theft may be stored. The secondary memories 208 may read from and/or write to between themselves in a well-known manner.

Computing platform 200 may also include a keyboard 212, a mouse 214, and a display 210 for allowing a user to interface with computing platform 200. Keyboard 212, mouse 214, and display 210 may be coupled to communications bus 203. Computing platform 200 may also include a display adapter 216. Display adapter 216 may be coupled to communication bus 203. Display adapter 216 can interface with the communication bus 203 and the display 210 and can receive display data from the processor 202 and converts the display data into display commands for the display 210.

Computing platform 200 may also include a network adapter 218. Network adapter 218 may be coupled to communication bus 203. Network adapter 218 may allow computing platform 200 to send and receive data via a network, such as network 106.

According to embodiments of the present disclosure, any of the methods for preventing information theft can be embodied on a computer readable storage medium as instruction for causing a computer platform to perform the instructions. The computer readable storage medium may include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software programs of the computer program on a CD-ROM or via Internet download. In a sense, the Internet itself, as an abstract entity, is a computer readable medium. The same is true of computer networks in general.

Figure 3:
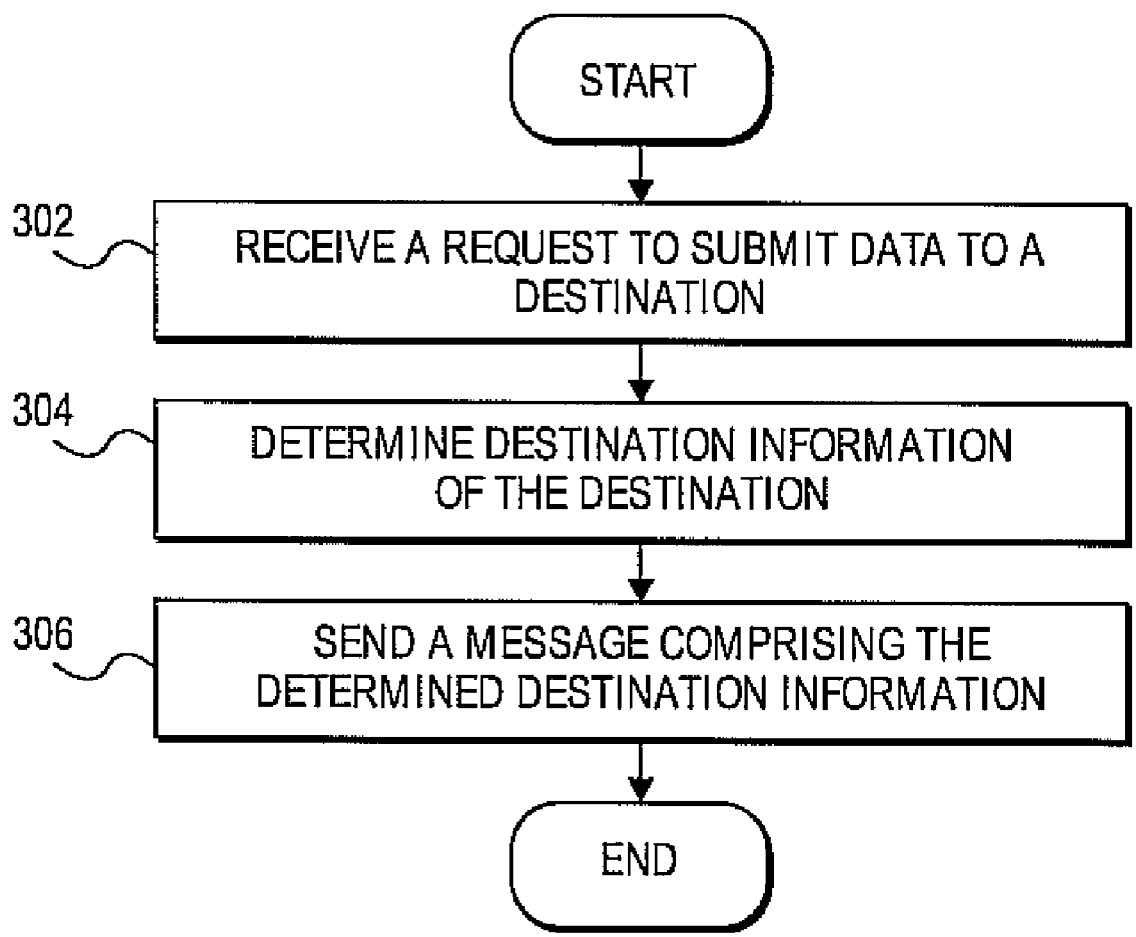
FIG. 3 is a flow diagram illustrating a method for determining a destination of submitted data consistent with embodiments of the present disclosure.

FIG. 3 is a flow diagram illustrating a method 300 for providing destination information to prevent information theft consistent with embodiments of the disclosure. Method 300 prevents information theft by providing a user with information about a secure destination, for example, a SSL website. By providing the user with information about the secure destination, the user may confirm that the secure destination is the correct destination.

Method 300 may be implemented in an application for granting access. For example, method 300 may be performed by a web browser or website hosting application executed on a computing platform. Method 300 may be performed on any computing platform or computing platform in a network system, such as computer platform 200 and network system 100 described below. One skilled in the art will realize that method 300 may be performed on any computing platform in which access to a system requires entry of access information.

Figure 4:
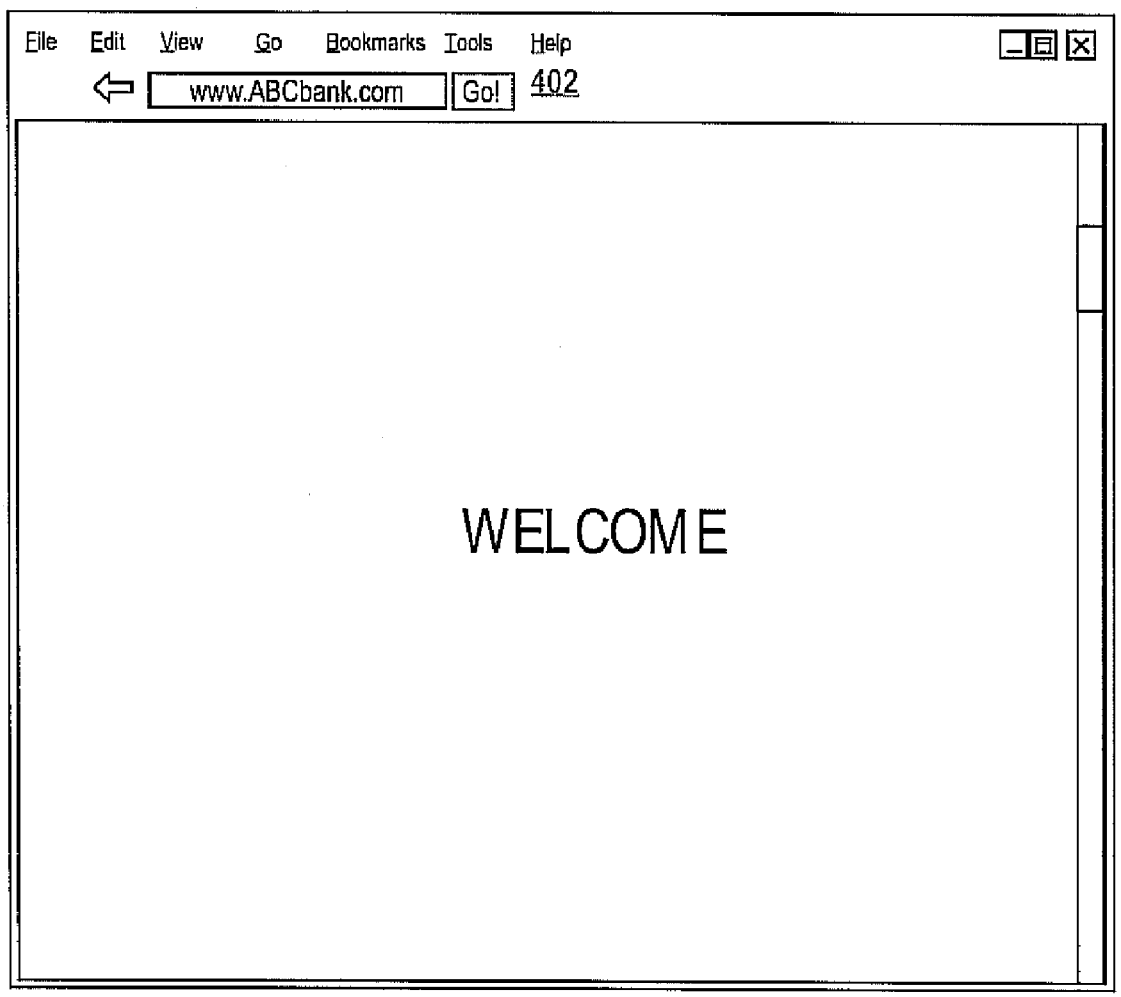
FIGS. 4 and 5 are diagrams illustrating an exemplary application window consistent with embodiments of the present disclosure.

Method 300 begins when a web browser receives a request to submit data to a secure destination such as an SSL website (stage 302). For example, a user may request access to a banking website to perform a financial transaction. As such, the web browser may be required to establish a secure connection to the website so that the user may transmit sensitive information. FIG. 4 is a diagram illustrating an exemplary browser for establishing a connection to a SSL website. To establish a connection, the user may enter the address of the SSL website, for example www.abcbank.com, in field 402. Once a connection has been established, the user may enter information into the secure website.

Before the user enters any information, the browser determines destination information of the secure destination (stage 304). For example, the browser may determine the true and complete destination of data submitted in the secure destination, such as an SSL website. In addition, the browser may indicate to the user whether the requested destination is "safe" or "unsafe" before the user submits any information to that destination. In particular, if form fields are being submitted by the user, then a safe/unsafe indication may be provided before the user submits any information.

Further, once the browser determines the true destination, the browser may validate the destination. The validity may be determined by analyzing the address of the destination. The validity of the destination may be determined by comparing the address of the destination to a list of suspect addresses. The validity of the address may be determined by performing a statistical analysis on the address. Additionally, the validity of the address may be determined by performing a character analysis on the address Then, the browser may send a message to the user indicating the determined destination information (stage 306). For example, the message may include the destination of information to be entered into the secure website. In addition, the browser may alert the user in other ways. For example, the safety of the submission may be indicated visually, such as making the background of the web page a prominent color, such as red or green, making the "submit" button a certain color, or by writing text into a part of the browser's display, such as the browser's chrome portion.

Figure 5:
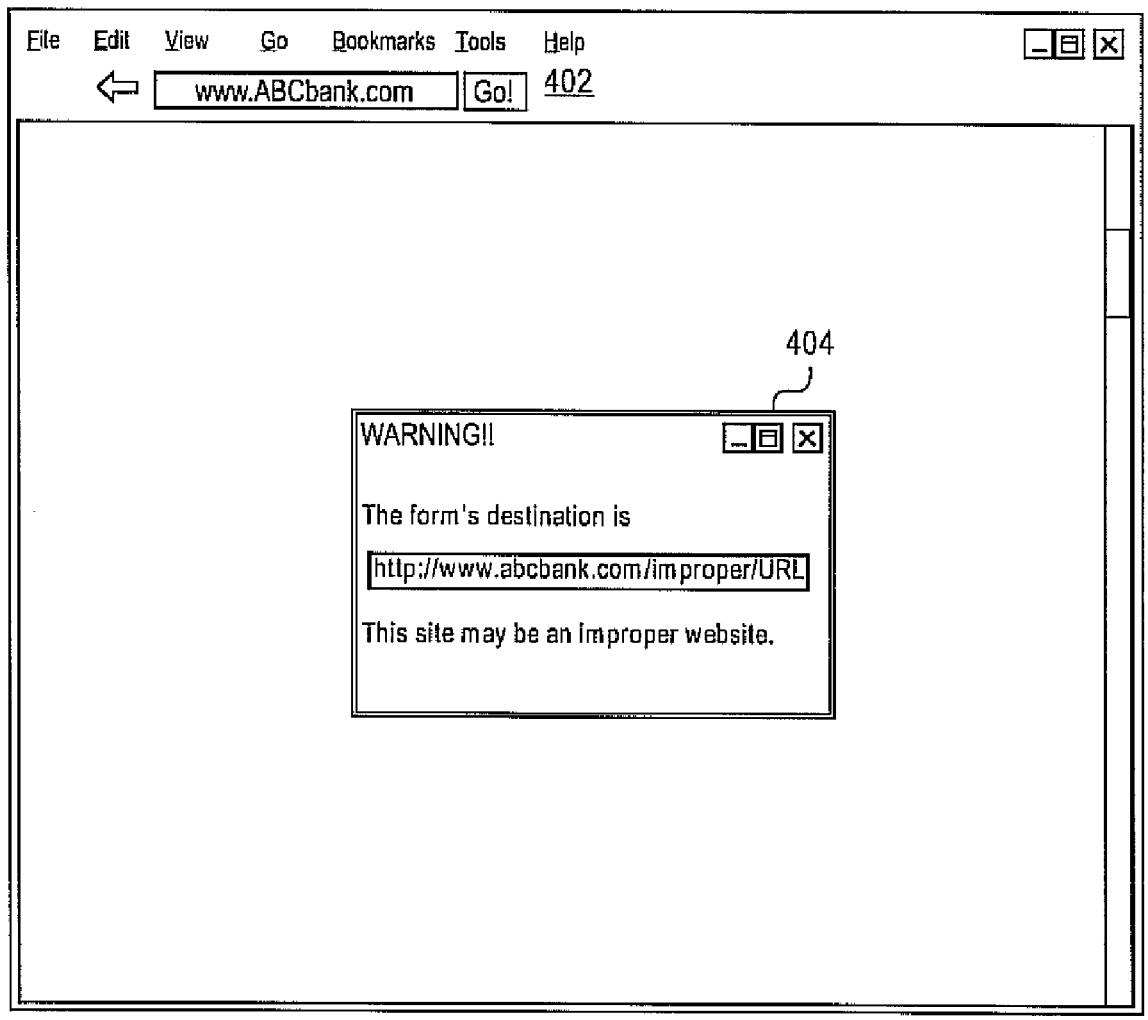

FIG. 5 is a diagram illustrating an exemplary message according to embodiments of the present disclosure. As shown in FIG. 3, a UI 502 may be displayed in the browser informing the user of the destination of information submitted in the website. As shown in FIG. 5, UI 502 may include the complete address of the destination.

Other embodiments of the present teaching will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of providing destination information, comprising:
   receiving a request to connect to a destination;
   determining destination information of the destination; and
   alerting a user interface of the determined destination information before information to be submitted to and used by the destination is supplied to the user interface, wherein the determined destination information comprises a complete address of the destination to which the information is to be submitted.

2. The method of claim 1, wherein the destination information comprises a universal resource locater (URL).

3. The method of claim 2, wherein the destination information further comprises a complete URL.

4. The method of claim 1, further comprising:
   determining a validity of the destination by analyzing the complete address of the destination; and
   alerting the user interface of the determined validity.

5. The method of claim 4, wherein determining the validity comprises:
   comparing the complete address of the destination to a list of addresses identified as suspicious.

6. The method of claim 4 wherein determining the validity comprises:
   authenticating a security certificate of the destination.

7. The method of claim 4, wherein determining the validity comprises:
   performing a character analysis on the address.

8. The method of claim 1, wherein the destination information comprises an indication of a safety of the destination.

9. A computer readable storage medium comprising computer-readable instructions for causing a processor to perform the method of claim 1.

10. A method of informing a user of destination information of a web form, comprising:
    receiving a request to submit the web form to an address, wherein the web form comprises one of more fields to be populated with information to be used by the address;
    determining the destination information of the address;
    sending a message to the user before the information is supplied to the one or more fields of the web form comprising the destination information of the address, wherein the destination information comprises a complete universal resource locater (URL) to which the web form is to be submitted.

11. The method of claim 10, wherein the message is sent to a user interface of a web browser.

12. A system for providing destination information, comprising:
    an input for receiving a request to connect to a destination; and
    a processor configured to determine destination information of the destination, and send a message to a user interface before information to be submitted to and used by the destination is supplied to the user interface comprising the determined destination information, wherein the determined destination information comprises a complete address of the destination to which the information is to be submitted.

13. The system of claim 12, wherein the processor is further configured to determine a validity of the destination by analyzing the complete address of the destination and send the determined validity in the message.

* * * * *